US008059958B1

(12) United States Patent
Jiang et al.

(10) Patent No.: US 8,059,958 B1
(45) Date of Patent: Nov. 15, 2011

(54) MEASUREMENT OF POLARIZATION DEPENDENT LOSS IN AN OPTICAL TRANSMISSION SYSTEM

(75) Inventors: Junfeng Jiang, Tianjin (CN); Rongqing Hui, Lenexa, KS (US); Douglas L. Richards, Stilwell, KS (US); Stephen A. Oliva, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 617 days.

(21) Appl. No.: 12/249,073

(22) Filed: Oct. 10, 2008

(51) Int. Cl.
*H04B 10/08* (2006.01)
*H04B 17/00* (2006.01)

(52) U.S. Cl. ........................................................ 398/28

(58) Field of Classification Search ................ 398/28
See application file for complete search history.

(56) References Cited

U.S. PATENT DOCUMENTS

| | | | |
|---|---|---|---|
| 5,371,597 A | 12/1994 | Favin et al. |
| 6,104,477 A | 8/2000 | Yoshida et al. |
| 6,449,033 B2 | 9/2002 | Marro et al. |
| 6,650,406 B1 | 11/2003 | Allard et al. |
| 6,657,709 B2 | 12/2003 | Koh et al. |
| 6,798,510 B2 | 9/2004 | Fujita |
| 6,856,386 B2 | 2/2005 | Anderson et al. |
| 6,888,624 B2 | 5/2005 | Caplette et al. |
| 7,187,860 B2 | 3/2007 | Bergano et al. |
| 7,206,517 B1 | 4/2007 | Yu et al. |
| 7,305,183 B2 | 12/2007 | Roberts et al. |
| 2001/0052973 A1 | 12/2001 | Marro et al. |
| 2002/0149823 A1 | 10/2002 | Bergano et al. |
| 2003/0039005 A1 | 2/2003 | Roberts et al. |
| 2003/0117625 A1 | 6/2003 | Fujita |
| 2004/0001202 A1 | 1/2004 | Caplette et al. |
| 2006/0115199 A1 | 6/2006 | Yao |
| 2007/0086783 A1 | 4/2007 | Bergano et al. |
| 2008/0038000 A1 | 2/2008 | Yu et al. |
| 2008/0100847 A1* | 5/2008 | Szafraniec ................ 356/491 |

OTHER PUBLICATIONS

Zhu et al, "A Comparison of Wavelength Dependent Polarization Dependent Loss Measurements in Fiber Gratings", IEEE Transactions on Instrumentation and Measurement, vol. 49, No. 6, Dec. 2000.*
Christopher T. Allen, et al., "Measured Temporal and Spectral PMD Characteristics and Their Implications for Network-level Mitigation Approaches," Journal of Lightwave Technology, Jan. 2003, pp. 79-86, vol. 21, No. 1, IEEE.
Norman C. Beaulieu, "An Infinite Series for the Computation of the Complementary Probability Distribution Function of a Sum of Independent Random Variables and Its Application to the Sum of Rayleigh Random Variables," IEEE Transactions on Communications, Sep. 1990, pp. 1463-1474, vol. 28, No. 9, IEEE.
M. Brodsky, et al., "A "Hinge" Model for the Temporal Dynamics of Polarization Mode Dispersion," 2004, pp. 90-91, IEEE.

(Continued)

*Primary Examiner* — Shi K Li

(57) ABSTRACT

A method is provided for measuring polarization dependent loss in an optical transmission system. In the method, a first optical signal is generated, and a polarization of the first optical signal is altered over time. The first optical signal is combined with a second optical signal from the optical transmission system to yield a combined optical signal, which is coherently detected to yield a radio frequency signal. A power of the radio frequency signal is measured. The measured power of the radio frequency signal is processed to generate an indication of the polarization dependent loss of the optical transmission system.

18 Claims, 5 Drawing Sheets

OTHER PUBLICATIONS

Liang Chen, et al., "Effect of Local PMD and PDL Directional Correlation on the Principal State of Polarization Vector Autocorrelation," Optics Express, Nov. 17, 2003, pp. 3141-3146, vol. 11, No. 23, Optical Society of America.

Liang Chen, et al., "Polarization Dependent Loss Vector Measurement in a System with Polarization Mode Dispersion," Optical Fiber Technology, Mar. 14, 2005, pp. 251-254, Elsevier Inc.

Liang Chen, et al., "Polarization-mode Dispersion Measurement in a System with Polarization-dependent Loss or Gain," IEEE Photonics Technology Letters, Jan. 2004, pp. 206-208, vol. 16, No. 1, IEEE.

Rex M. Craig, et al., "High-resolution, Nonmechanical Approach to Polarization-dependent Transmission Measurements," Journal of Lightwave Technology, Jul. 1998, pp. 1285-1294, vol. 16, No. 7, IEEE.

A. El Amari, et al., "Statistical Prediction and Experimental Verification of Concatenations of Fiber Optic Components with Polarization Dependent Loss," Journal of Lightwave Technology, Mar. 1998, pp. 332-339, vol. 16, No. 3, IEEE.

A. Eyal, et al., "Measurement of Polarization Mode Dispersion in Systems Having Polarization Dependent Loss or Gain," IEEE Photonics Technology Letters, Sep. 1997, pp. 1256-1258, vol. 9, No. 9, IEEE.

Ricardo Feced, et al., "Ineraction Between Polarization Mode Dispersion and Polarization-dependent Losses in Optical Communication Links," Journal of the Optical Society of America, Mar. 2003, pp. 424-433, vol. 20, No. 3, Optical Society of America.

Y. Fukada, et al., "BER Fluctuation Suppression in Optical In-line Amplifier Systems Using Polarisation Scrambling Technique," Electronics Letters, Jan. 21, 1994, pp. 432-433, vol. 30, No. 5, IEEE.

Youichi Fukada, "Probability Density Function of Polarization Dependent Loss (PDL) in Optical Transmission System Composed of Passive Devices and Connecting Fibers," Journal of Lightwave Technology, Jun. 2002, pp. 953-964, vol. 20, No. 6, IEEE.

Andrea Galtarossa, et al., "The Exact Statistics of Polarization-dependent Loss in Fiber-optic Links," IEEE Photonics Technology Letters, Jan. 2003, p. 57, vol. 15, No. 1, IEEE.

Andrea Galtarossa, et al., "Theoretical Analysis of Reflectometric Measurements in Optical Fiber Links Affected by Polarization-dependent Loss," Journal of Lightwave Technology, May 2003, pp. 1233-1240, vol. 21, No. 5, IEEE.

N. Gisin, et al., "Combined Effects of Polarization Mode Dispersion and Polarization Dependent Losses in Optical Fibers," Optics Communications, Oct. 1, 1997, pp. 119-125, vol. 142, NH Elsevier.

N. Gisin, "Statistics of Polarization Dependent Losses," Optics Communications, Feb. 15, 1995, pp. 399-405, vol. 114, NH Elsevier.

J.P. Gordon, et al., "PMD Fundamentals: Polarization Mode Dispersion in Optical Fibers," PNAS Review, Apr. 25, 2000, pp. 4541-4550, vol. 97, No. 9, Proceedings of the National Academy of Sciences of the United States of America.

Saeed Hadjifaradji, et al., "Autocorrelatioin Function of the Principal State of Polarization Vector for Systems Having PMD," IEEE Photonics Technology Letters, Jun. 2004, pp. 1489-1491, vol. 16, No. 6, IEEE.

B.L. Heffner, "Deterministic, Analytically Complete Measurement of Polarization-dependent Transmission Through Optical Devices," IEEE Photonics Technology Letters, May 1992, pp. 451-454, vol. 4, No. 5, IEEE.

Jeremiah Hu, et al., "Accurate Simple Closed-form Approximations to Rayleigh Sum Distributions and Densities," IEEE Communications Letters, Feb. 2005, pp. 109-111, vol. 9, No. 2, IEEE.

R. Hui, et al., "Non-blocking PMD Monitoring in Live Optical Systems," Electronics Letters, Jan. 4, 2007, 2 pages, vol. 43, No. 1, IET.

B. Huttner, et al., "Polarization-induced Distortions in Optical Fiber Networks with Polarization-mode Dispersion and Polarization-dependent Losses," IEEE Journal of Selected Topics in Quantum Electronics, Mar./Apr. 2000, pp. 317-329, vol. 6, No. 2, IEEE.

A. Eyal, et al., "A Modified Poincare Sphere Technique for the Determination of Polarization-mode Dispersion in the Presence of Differential Gain/loss," Technical Digest, 1998, p. 340, Tel-Aviv, Israel.

Irene Joindot, "Measurements of Relative Intensity Noise (RIN) in Semiconductor Lasers," Journal De Physique III, Sep. 1992, pp. 1591-1603, vol. 2, No. 9, Lannion, France.

George K. Karagiannidis, et al., "A Closed-form Upper-bound for the Distribution of the Weighted Sum of Rayleigh Variates," IEEE Communications Letters, Jul. 2005, pp. 589-591, vol. 9, No. 7, IEEE.

George K. Karagiannidis, et al., "On the Distribution of the Weighted Sum of L Independent Rician and Nakagami Envelopes in the Presence of AWGN," 2001, 8 pages, KICS.

Magnus Karlsson, et al., "Autocorrelation Function of the Polarization-mode Dispersion Vector," Optics Letters, Jul. 15, 1999, pp. 939-941, vol. 24, No. 14, Optical Society of America.

Magnus Karlsson, et al., "Long-term Measurement of PMD and Polarization Drift in Installed Fibers," Journal of Lightwave Technology, Jul. 2000, pp. 941-951, vol. 18, No. 7, IEEE.

Magnus Karlsson, et al., "Quaternion Approach to PMD and PDL Phenomena in Optical Fiber Systems," Journal of Lightwave Technology, Apr. 2004, pp. 1137-1146, vol. 22, No. 4, IEEE.

J.H. Lee, et al., "Effect of PDL on OSNR Monitoring Technique Using Polarization-nulling Method," OThP4.pdf, 2005, 3 pages, Optical Society of America.

Yi Li, et al., "Solutions to the Dynamical Equation of Polarization-mode Dispersion and Polarization-dependent Losses," Journal of the Optical Society of America, Nov. 2000, pp. 1821-1827, vol. 17, No. 11, Optical Society of America.

Ping Lu, et al., "Statistical Distribution of Polarization-dependent Loss in the Presence of Polarization-mode Dispersion in Single-mode Fibers," IEEE Photonics Technology Letters, May 2001, pp. 451-453, vol. 13, No. 5, IEEE.

Antonio Mecozzi, et al., "The Statistics of Polarization-dependent Loss in Optical Communication Systems," IEEE Photonics Technology Letters, Mar. 2002, pp. 313-315, vol. 14, No. 3, IEEE.

Alexei N. Pilipetskii, et al., "Performance Fluctuations in Submarine WDM Systems," Journal of Lightwave Technology, Nov. 2006, pp. 4208-4214, vol. 24, No. 11, IEEE.

Pierluigi Poggiolini, et al., "Long-term PMD Characterization of a Metropolitan G.652 Fiber Plant," Journal of Lightwave Technology, Nov. 2006, pp. 4022-4029, vol. 24, No. 11, IEEE.

Yongqiang Shi, et al., "Automatic Maximum-minimum Search Method for Accurate PDL and DOP Characterization," Journal of Lightwave Technology, Nov. 2006, pp. 4006-4012, vol. 24, No. 11, IEEE.

Hidenori Taga, et al., "Recent Progress in Amplified Undersea Systems," Journal of Lightwave Technology, May 1995, pp. 829-840, vol. 13, No. 5, IEEE.

M.G. Taylor, et al., "Improvement in Performance of Long Haul EDFA Link Using High Frequency Polarisation Modulation," Electronics Letters, May 12, 1994, pp. 805-806, vol. 30, No. 10, IET.

Chongjin Xie, et al., "Suppression of Intrachannel Nonlinear Effects with Alternate-polarization Formats," Journal of Lightwave Technology, Mar. 2004, pp. 806-812, vol. 22, No. 3, IEEE.

L.S. Yan, et al., "Statistical Measurement of the Combined Effect of PMD and PDL Using a 10-Gb/s Recirculating Loop Testbed," WT5, 2000, 3 pages, Optical Society of America.

\* cited by examiner

MEASUREMENT OF POLARIZATION DEPENDENT LOSS IN AN OPTICAL TRANSMISSION SYSTEM

TECHNICAL BACKGROUND

A long-known limitation to performance of high-speed, long-haul optical fiber transmission systems is polarization dependent loss (PDL). Generally, PDL is the power loss of an optical signal propagating over an optical transmission system that is dependent on the polarization state of the optical signal. Typically, PDL is defined numerically as the difference between the maximum and minimum loss over all possible polarization states of the transmitted optical signal.

Typically, PDL is introduced into an optical transmission system by way of the individual components constituting the system, such as optical fibers, amplifiers, couplers, isolators, multiplexers, and the like. While each of these components exhibits a definable PDL, summing the PDL of each component in an optical transmission system typically does not yield an accurate measure of the PDL for the entire system since many different relative orientations between the components are possible. As a result, the PDL of an optical transmission system is measured over the complete assembled system.

Several methods have been implemented or proposed for PDL measurement of a complete optical transmission system, each of which employs a specialized test signal applied at a transmitter of the system and a measurement device at a receiver of the system. Thus, PDL system testing normally involves simultaneous access and control of both ends of the optical transmission system.

Overview

Discussed herein is a method for measuring polarization dependent loss in an optical transmission system. In the method, a first optical signal is generated, and a polarization of the first optical signal is altered over time. The polarized first optical signal is combined with a second optical signal from the optical transmission system to yield a combined optical signal. The combined optical signal is then coherently detected to yield a radio frequency signal, the power of which is measured. The measured power of the radio frequency signal is processed to generate an indication of the polarization dependent loss of the optical transmission system.

Also presented herein is an apparatus for measuring polarization dependent loss in an optical transmission system. The apparatus includes an optical signal generator configured to generate a first optical signal, as well as an optical polarization controller configured to alter a polarization of the first optical signal over time. Also included in the apparatus is an optical coupler configured to combine the polarized first optical signal with a second optical signal from the optical transmission system to yield a combined optical signal. The apparatus also includes a coherent detector configured to generate a radio frequency signal from the combined optical signal, and a power meter configured to measure a power of the radio frequency signal. Also included in the apparatus is a processor configured to process the measured power of the radio frequency signal to generate an indication of the polarization dependent loss of the optical transmission system. A computer-readable medium comprising instructions executable by such a processor for processing the measured power of the radio frequency signal to generate the indication of the polarization dependent loss of the system is also disclosed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

The following description and associated figures depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
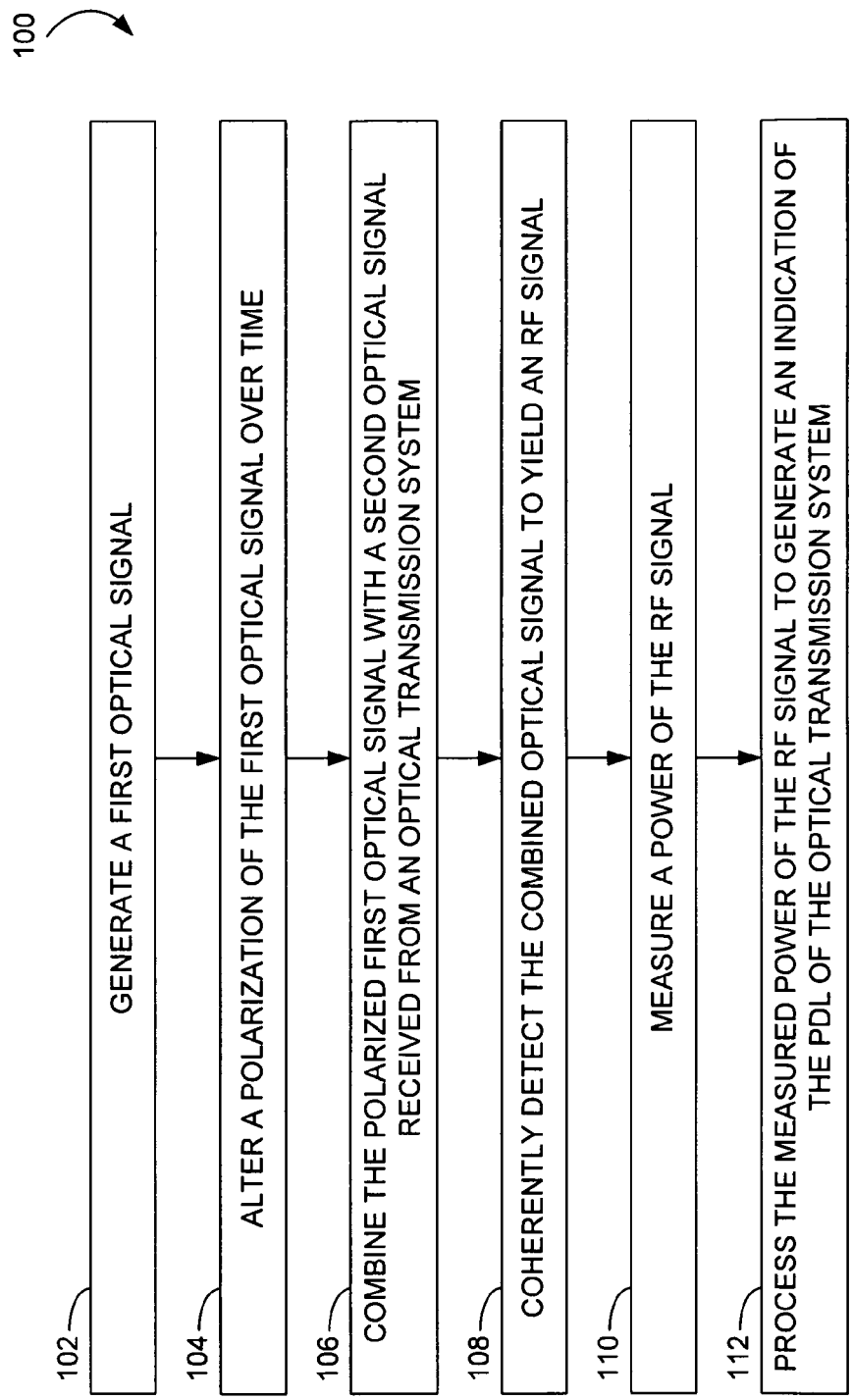
FIG. 1 is a flow diagram illustrating a method according to an embodiment of the invention for measuring polarization dependent loss in an optical transmission system.

FIG. 1 provides a flow diagram of a method 100 according to an embodiment of the invention for measuring polarization dependent loss (PDL) in an optical transmission system. In the method 100, a first optical signal is generated (operation 102), and a polarization of the first optical signal is altered over time (operation 104). The polarized first optical signal is then combined with a second optical signal from the optical transmission system to yield a combined optical signal (operation 106). In one example, the second optical signal is an optical signal carrying live communication traffic that has been transmitted over the optical transmission system under test. Coherent detection is then performed on the combined optical signal to yield a radio frequency signal (operation 108), and a power of the radio frequency signal is measured (operation 110). The measured power of the radio frequency signal is then processed to generate an indication of the polarization dependent loss of the optical transmission system (operation 112).

Figure 2:
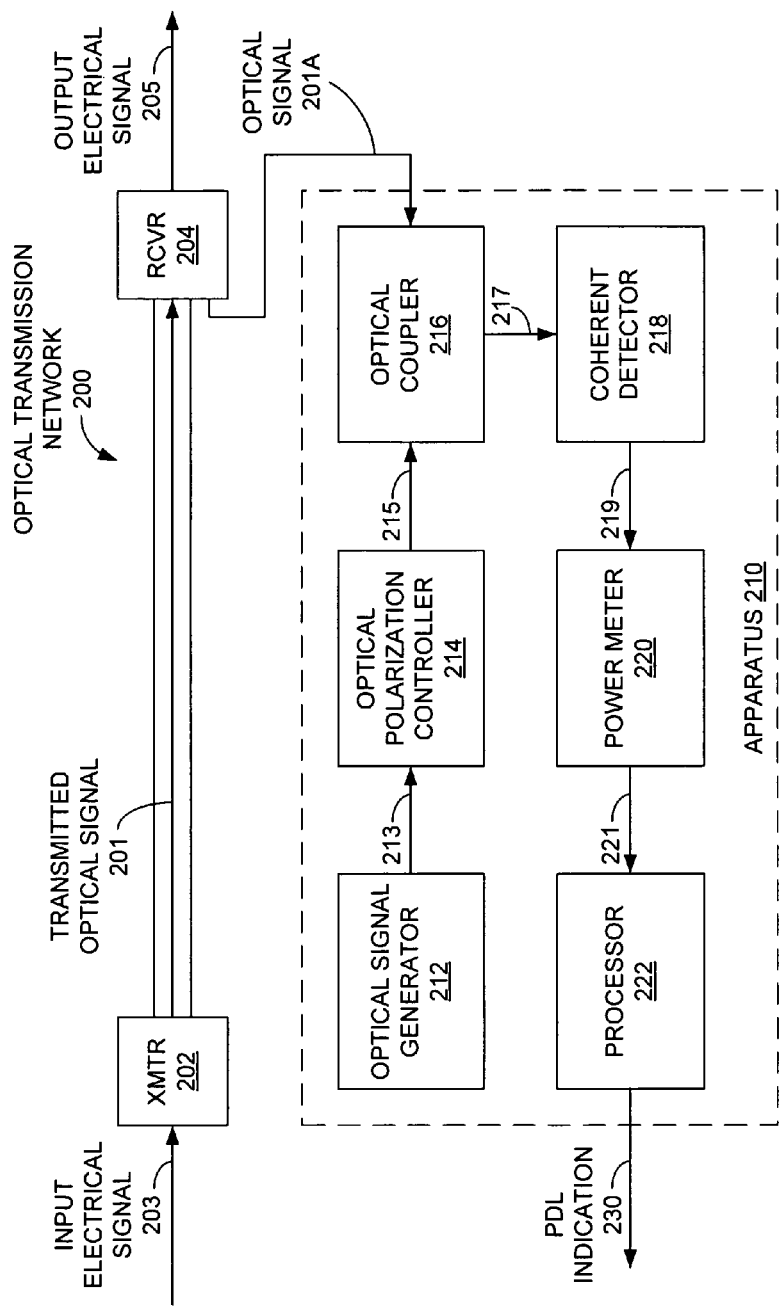
FIG. 2 is a simplified block diagram of an optical transmission system in conjunction with an apparatus for measuring polarization dependent loss in the system according to an embodiment of the invention.

FIG. 2 depicts an idealized optical transmission network 200 including an optical transmitter 202 for accepting an input electrical signal 203 and transmitting a corresponding optical signal 201 over the network 200, and an optical receiver 204 for receiving the transmitted signal 201 and generating a corresponding output electrical signal 205. In one example, the transmitted optical signal 201 carries one or more channels of live communication traffic during normal operation of the optical transmission network 200, although other types of optical signals transmitted over the network 200 may be employed in other implementations.

Typically, the network 200 will include a number of optical elements and supporting electronic devices, including, but not limited to, optical fibers, amplifiers, couplers, isolators, and multiplexers. The network 200 may also be configured to transmit an optical signal carrying one or multiple communication channels, such as a wavelength division multiplexed (WDM) or dense wavelength division multiplexed (DWDM) signal. Many other types of optical signals of varying power, wavelength, and other optical characteristics may be carried over the network 200 in various implementations while remaining within the scope of the invention.

The transmitted optical signal 201, or a portion thereof, may be collected from the optical transmission network 200 by way of a separate optical tap, an optical add/drop multiplexer (OADM), an optical tap in an optical receiving terminal, or any other means of obtaining the transmitted optical signal 201 or some portion thereof from the optical transmission network 200. In FIG. 2, the transmitted optical signal 201 is shown being optically tapped to yield an optical signal 201A from an optical input of the receiver 204, although any of the above methods may be employed to collect at least a portion of the transmitted optical signal 201. In other embodiments, the transmitted optical signal 201 may be monitored from another point between the transmitter and the receiver 204 to monitor the PDL attributed to the portion of the network between the transmitter 202 and the monitoring point.

Once collected from the network 200, the optical signal 201A is directed to an apparatus 210 for testing the PDL of the optical transmission network 200 using the signal 201A. The apparatus 210 includes an optical signal generator 212, an optical polarization controller 214, an optical coupler 216, a coherent detector 218, a power meter 220, and a processor 222. Generally, the optical signal generator 212 is configured to generate a separate optical signal 213. The optical polarization of the controller 214 is configured to polarize and alter the polarization of this optical signal 213 over time, thus yielding a polarized optical signal 215. The optical coupler 216 then combines the polarized optical signal 215 with the optical signal 201A from the optical transmission network 200 to produce a combined optical signal 217.

The combined optical signal 217 is then passed to the coherent detector 218 to generate a radio frequency (RF) signal 219 based upon the combined optical signal 217. The power meter 220 measures a power of the RF signal 219, and then passes this power measurement 221 to the processor 222, which process the power measurement 221 to generate an indication of the PDL of the optical transmission network 200.

Figure 3:
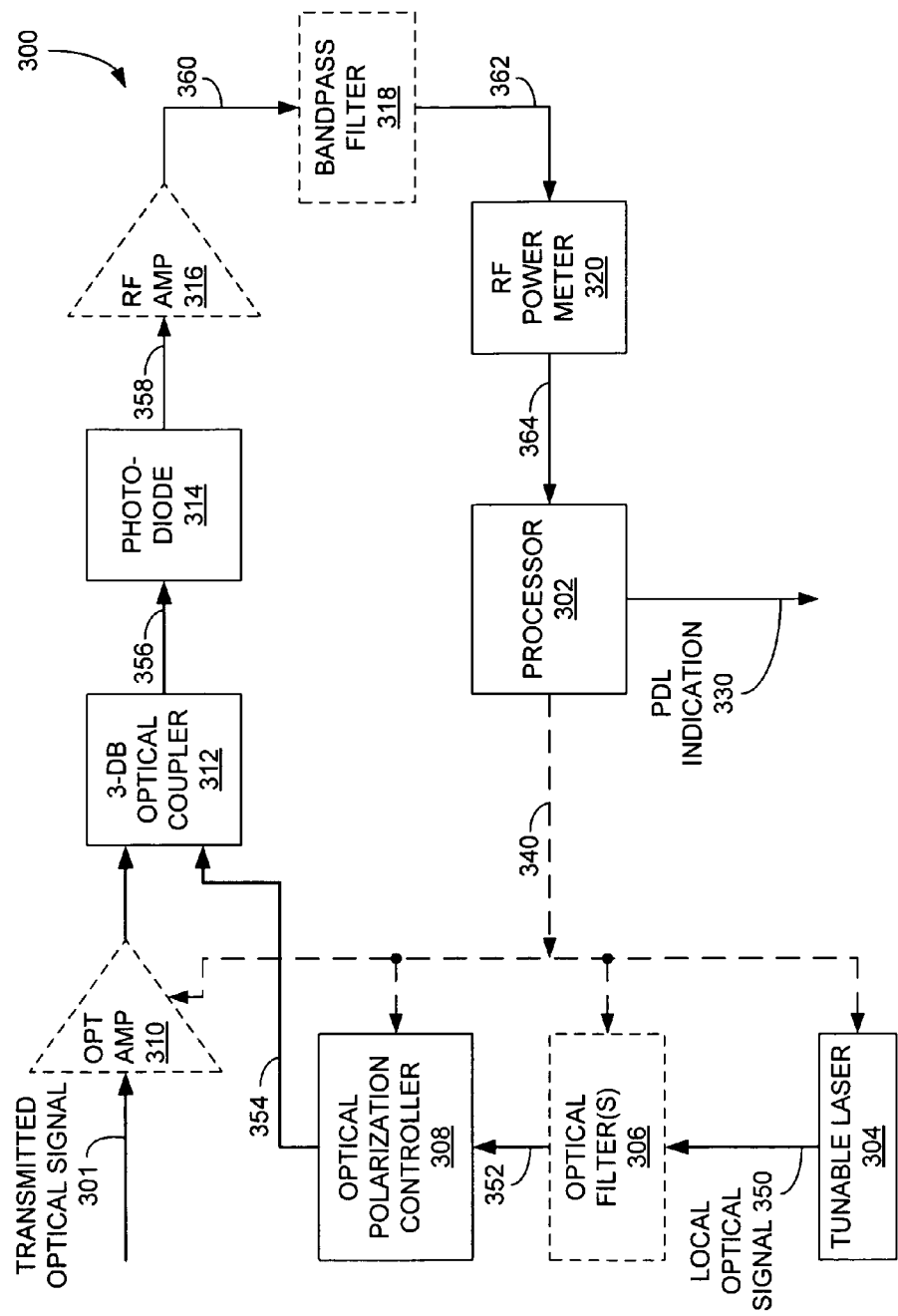
FIG. 3 is a simplified block diagram of an apparatus for measuring polarization dependent loss in an optical transmission system according to another embodiment of the invention.

FIG. 3 presents a block diagram of an apparatus 300 akin to the apparatus 210 of FIG. 2. The apparatus 300 performs a statistical analysis of an optical signal 301 tapped or otherwise obtained from an optical signal that has been transmitted over an optical transmission network, similar to the optical signal 201A associated with the network 200 of FIG. 2. By way of signal measurement and statistical analysis, the apparatus 300 is configured to measure the PDL of the optical transmission network from which the optical signal 301 was obtained. Further, the transmitted signal from which the optical signal 301 is obtained may be a signal over which the apparatus 300 has little or no control, such as a signal that carries live communication traffic. Thus, specialized test signals need not be transmitted over the network of interest to perform the measurement.

Before describing the operation of the apparatus 300, a discussion regarding the optical polarization characteristics of an optical transmission network, and the relationship of these characteristic to the PDL of the network, is warranted. In the Poincaré space, the effect of the network on the polarization of an input optical signal can be described by way of a Mueller matrix relating the input optical signal to the resulting output signal from the network:

$$\begin{bmatrix} s_{out0} \\ s_{out1} \\ s_{out2} \\ s_{out3} \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix} \begin{bmatrix} s_{in0} \\ s_{in1} \\ s_{in2} \\ s_{in3} \end{bmatrix} \quad \text{(Equation 1)}$$

More specifically, the elements $m_{i,j}$ (i, j=1, 2, 3, 4) of the Mueller matrix describe the characteristics of the optical transmission network. When cross-multiplied with an input Stokes vector having elements $s_{inx}$ (x=0, 1, 2, 3) describing the polarization state of the input optical signal, the Mueller matrix produces the output Stokes vector of elements $s_{outx}$ (x=0, 1, 2, 3) associated with the output vector.

Typically, since PDL is a measurement of the effect of the network on the output power of an optical signal, only $s_{out0}$, the element of the output Stokes vector describing the power of the output optical signal, need be considered. From the cross-product shown above in Equation 1, $s_{out0}$ is calculated by summing the product of each element of the first row of the Mueller matrix and each corresponding element of the input Stokes matrix:

$$s_{out0} = m_{11}s_{in0} + m_{12}s_{in1} + m_{13}s_{in2} + m_{14}s_{in3} \quad \text{(Equation 2)}$$

A power transmission coefficient T representing a ratio of the power of the output optical signal to the power of the input optical signal may then be generated:

$$\begin{aligned} T &= \frac{s_{out0}}{s_{in0}} = m_{11} + \frac{s_{in1}}{s_{in0}}m_{12} + \frac{s_{in2}}{s_{in0}}m_{13} + \frac{s_{in3}}{s_{in0}}m_{14} \quad \text{(Equation 3)} \\ &= m_{11} + DOP \cdot [s_1 m_{12} + s_2 m_{13} + s_3 m_{14}] \\ &= m_{11} + DOP(\vec{s} \cdot \vec{m}) \\ &= m_{11} + DOP|\vec{m}|\cos\theta \end{aligned}$$

In Equation 3, matrix elements $m_{11}$ and $\vec{m} = (m_{12}, m_{13}, m_{14})$ are elements from the Mueller matrix, $\vec{s} = (s_1, s_2, s_3)$ is the normalized input polarization vector with $s_j = s_{inj}/[s_{in1}^2 + s_{in2}^2 + s_{in3}^2]^{1/2}$ (j=1, 2, 3), DOP=$[s_{in1}^2 + s_{in2}^2 + s_{in3}^2]^{1/2}/s_{in0}$ is the degree of polarization of the input optical signal, and θ is the angle between $\vec{m}$ and the normalized input polarization vector $\vec{s}$. Generally, the input optical signal of an optical system carrying live traffic is provided by a laser diode in the transmitter, and thus exhibits a high degree of polarization. Therefore, presuming the degree of polarization DOP=1 above, Equation 3 may be simplified as $T = m_{11} + |\vec{m}|\cos\theta$.

Due to the random nature of global PDL of the optical transmission network, the power transmission coefficient T varies with time. However, as seen by the definition of the power transmission coefficient T above, identified with each PDL value is a maximum power transmission coefficient $T_{max} = m_{11} + |\vec{m}|$ (when θ=0) and a minimum power transmission coefficient $T_{min} = m_{11} - |\vec{m}|$ (when θ=π). These minimum and maximum values of the coefficient T may then be used to describe the magnitude Γ of a PDL vector $\vec{\Gamma}$:

$$\Gamma = \frac{T_{max} - T_{min}}{T_{max} + T_{min}} = \frac{|\vec{m}|}{m_{11}} = \frac{\sqrt{m_{12}^2 + m_{13}^2 + m_{14}^2}}{m_{11}} \quad \text{(Equation 4)}$$

The PDL vector $\vec{\Gamma}$ is parallel to the polarization state vector $\bar{s}$, which corresponds to the direction of the maximum transmission coefficient $T_{max}$. Also, Equation 3 indicates that the orientation of the PDL vector $\vec{\Gamma}$ is determined by $\vec{m}$. Thus, the global PDL vector $\vec{\Gamma}$ can be defined as $\vec{\Gamma} = \vec{m}/m_{11}$.

A more traditional definition of PDL is $\rho = 10 \log_{10}(T_{max}/T_{min})$, with the numerical value of the PDL being specified in decibels (dB). As a result, the relationship between the traditional definition of PDL $\rho$ and the magnitude $\Gamma$ of the PDL vector $\vec{\Gamma}$ is $\rho = 10 \log_{10}[(1+\Gamma)/(1-\Gamma)]$. When the magnitude $\Gamma$ of the PDL vector $\vec{\Gamma}$ is presumed to be much less than one, the traditional PDL value $\rho$ may be approximated:

$$\rho = 10 \log\left[1 + \frac{2\Gamma}{1-\Gamma}\right] \approx 8.6859\Gamma \quad \text{(Equation 5)}$$

As a result, Equation 5 indicates that the magnitude $\Gamma$ of the PDL vector $\vec{\Gamma}$ is linearly proportional to the traditional definition of PDL $\rho$, which is typically viewed as following a Maxwellian probability distribution. As a result, the magnitude $\Gamma$ of the PDL vector $\vec{\Gamma}$ should also follow such a distribution.

In the Mueller matrix employed above, the element $m_{11}$ represents a constant attenuation of the optical transmission system since the effect of $m_{11}$ on the system is independent of the polarization elements of the input Stokes vector representing the input optical signal, as described above. As a result, each element $m_{12}$, $m_{13}$, $m_{14}$ of the vector $\vec{m}$ used in the definition of the global PDL vector $\vec{\Gamma}$ should follow a normal (Gaussian) distribution with a mean of zero and a variance of $q^2$. The probability distribution of the global PDL magnitude $\Gamma$ may then also be expressed as a Gaussian distribution:

$$p(\Gamma) = \sqrt{\frac{2}{\pi}} \frac{\Gamma^2}{(q/m_{11})^3} \exp\left(-\frac{\Gamma^2}{2(q/m_{11})^2}\right) \quad \text{(Equation 6)}$$

Given the above distribution, a mean or average value $<\Gamma>$ of the magnitude $\Gamma$ of the PDL vector $\vec{\Gamma}$ may be ascertained:

$$<\Gamma> = \sqrt{\frac{8}{\pi}} \frac{q}{m_{11}} \quad \text{(Equation 7)}$$

As a result, the average system PDL $<\Gamma>$ may be determined by two parameters: the constant attenuation $m_{11}$ of the system, and the standard deviation $q$ (or the variance $q^2$).

An arbitrary polarization state $\bar{s}=(1, 0, 0)$ for the input optical signal may be presumed, as coordinate rotation does not impact the power transmission coefficient T. Therefore, Equation 3 for the power transmission coefficient T may then be simplified:

$$T = m_{11} + m_{12} \quad \text{(Equation 8)}$$

Thus, the power transmission coefficient T also follows a normal distribution with a mean of $m_{11}$ and a variance of $q^2$. Hence, in a practical operating optical transmission system, measuring the statistical distribution of the power transmission coefficient T will yield its mean $m_{11}$ and variance of $q^2$, which may then be used in Equation 7 above to determine the average PDL magnitude $<\Gamma>$.

Generally, PDL is a static property of an optical transmission system, independent of the particular optical signal being carried over the system. However, in a typical system with a specific light source generating an optical signal with a fixed input signal polarization state, the optical signal may not experience the worst-case PDL of the system. As a result, the power transmission coefficient T defined in Equation 8 is related only to a partial PDL of the system. In the above case, with the polarization state $\bar{s}=(1, 0, 0)$ presumed, the magnitude of $\vec{m}=(m_{12}, m_{13}, m_{14})$ is $|\vec{m}|=|m_{12}|$, and the portion of the system global PDL vector $\vec{\Gamma}$ seen by the optical signal is $\Gamma_{partial}=|m_{12}|/m_{11}$. The partial PDL $\Gamma_{partial}$ follows a half-normal distribution.

Returning to FIG. 3, the apparatus 300 depicted therein is configured to measure the optical power transmission coefficient T of an optical signal 301, which was tapped or otherwise obtained from an optical signal transmitted over an optical transmission network in accordance with the preceding discussion. As is discussed in greater detail below, the optical power transmission coefficient T may then be used to determine the partial PDL and the average global PDL of the optical transmission system. For convenience, all optical signals are denoted in FIG. 3 by bold directional lines.

In one example, the optical signal transmitted over the optical network, from which the optical signal 301 is obtained may carry live communication traffic. The use of such an optical signal 301 as described hereinafter allows the measurement of the PDL associated with the optical transmission network without requiring the exclusive use of all or a portion of the network to transfer specialized test signals over the network. Such a passive, noninvasive measurement technique thus allows the network to operate normally while the measurement is being performed. In other implementations, specialized test signals may be employed as the optical signal 301 in lieu of live communication traffic.

The apparatus 300 includes a processor 302, a tunable laser 304, a polarization controller 308, an optical coupler 312, a photodiode 314, and an RF power meter 320. The apparatus 300 may also incorporate one or more optical filters 306, an optical amplifier 310, an RF amplifier 316, and a bandpass filter 318, as well as other components or devices not specifically denoted in FIG. 3 or described herein.

The tunable laser 304 of the apparatus 300 is configured to produce a locally-generated optical signal 350 employed as an oscillating signal for coherent heterodyne detection when combined with the optical signal 301. In one example, the wavelength of the local optical signal 350 may be tuned to match a wavelength of the optical signal 301. For example, the optical signal 301 may constitute a wavelength division multiplexed (WDM) or dense WDM (DWDM) signal incorporating multiple communication channels, with each channel occupying a predetermined portion of the total signal bandwidth. In this case, the tunable laser 304 may be tuned to a particular channel of the optical signal 301 to measure the PDL of the network as seen by that portion of the signal 301.

In one embodiment, the locally-generated optical signal 350 may be directed through one or more optical filters 306 to further condition and limit the bandwidth of the local signal 350, resulting in a filtered local optical signal 352. Depending on the characteristics of the tunable laser 304 and the nature of the optical signal 301, use of the optical filters 306, such as filters based on fiber Bragg gratings (FBGs), may be unnecessary in some implementations.

The local optical signal 350 (or the filtered optical signal 352, if the optical filters 306 are present) is directed to a polarization controller 308 configured to polarize, and to alter or modify the state of polarization, of the local optical signal 350 over a period of time to generate a polarized optical signal 354. In one embodiment, the polarization controller 308 continuously scans the state of polarization of the local optical signal 350 in an evenly-distributed fashion over the entire Poincaré sphere space. Further, once a scan of the sphere is complete, the scan may be repeated indefinitely. In one example, each scan of the sphere may require two seconds or less. Other processes or methods for altering the polarization of the local optical signal 350 may be employed in other embodiments.

An optical coupler 312 in the apparatus 300 combines the polarized local optical signal 354 with the optical signal 301 from the optical transmission network to yield a combined optical signal 356. While the optical coupler 312 employed in the specific embodiment of FIG. 3 is a 3-dB optical coupler, other types of optical couplers may be employed to similar end. In one implementation, an optical amplifier 310 may be utilized to amplify the optical signal 301 before directing the signal 301 to one of the inputs of the optical coupler 312.

The processor 302 of FIG. 3 may control any one or more of the tunable laser 304, the optical filter 306, the polarization controller 308, and the optical amplifier 310 by way of control signals or buses 340. For example, the processor 302 may tune the tunable laser 304 to produce a particular wavelength or wavelengths for the local optical signal 350, such as a wavelength corresponding to a particular WDM channel of the optical signal 301. Similarly, the processor 302 may control the particular polarization imparted on the local optical signal 350, and scan through the desired polarizations over the Poincaré sphere as described above. In the event the optical filter or filters 306 are present in the apparatus 300, the processor 302 may control which filter or filters 306 are being employed to filter the local optical signal 350 at any particular time to ensure only a desired wavelength or set of wavelengths is directed to the polarization controller 308. Further, the processor 302 may alter the gain of the optical amplifier 310 (if present in the apparatus 300) to more closely match the intensity of the optical signal 301 from the network with that of the polarized optical signal 354 before combining the two signals 301, 354 in the optical coupler 312.

The combined optical signal 356 from the output from the optical coupler 312 is then directed to a photodiode 314 configured to act as a coherent detector. Similar to the heterodyne detection often employed in radio signal receivers, coherent detection of the combined optical signal 356 occurs as a result of the optical signal 301 portion of the combined signal 356 "beating" against the polarized optical signal 354 portion. The resulting radio frequency (RF) signal 358 output from the photodiode 314 is proportional to the intensity or power of the optical signal 301.

In one implementation, an RF amplifier 316 may be incorporated in the apparatus 300 to amplify the RF signal 358, yielding an amplified RF signal 360. Such amplification may help compensate for any signal loss involved in the coherent detection process of the photodiode 314. Also, a bandpass filter 318 may be employed to limit the noise bandwidth of the amplified RF signal 360.

The resulting RF signal 362 from the bandpass filter 318 (or the RF signal 358, if the RF amplifier 316 and the bandpass filter 318 are not present) is then utilized as input to an RF power meter 320. In one implementation, the RF power meter 320 may produce a digital value for each RF power reading or sample captured by the meter 320. A data acquisition card (not explicitly shown in FIG. 3) may then convert the digital values to a measurement signal 364 having a time-varying voltage $V_{out}$ corresponding with the power of the RF signal 362. Such a data acquisition card may be integrated with either the RF power meter 320 or the processor 302. In another example, the RF power meter 320 may generate the measurement signal 364 having the voltage $V_{out}$ directly without the use of a data acquisition card.

In FIG. 3, the processor 302 receives the measurement signal 364 and processes the voltage $V_{out}$ to generate an indication of PDL 330 of the optical transmission system from which the optical signal 301 was obtained. In one embodiment, the value of the voltage $V_{out}$ may reflect the various factors shown in Equation 9:

$$V_{out} = \eta_D P_L P_s T \cos^2 \frac{\phi}{2} + V_{offset} + V_N \quad \text{(Equation 9)}$$
$$= kT \cos^2 \frac{\phi}{2} + V_{offset} + V_N$$

In Equation 9, $\eta_D$ is a general coefficient incorporating the effects of the responsivity of the photodiode 314, the coupling coefficient of the optical coupler 312, and effects of the RF amplifier 316, the bandpass filter 318, and the RF power meter 320, including any data acquisition circuitry. $P_s$ is the signal power of the optical signal 301 as originally launched into the optical transmission system, $P_L$ is the power of local optical signal 350 (or signal 354), and $k=\eta_D P_L P_s$. $\phi$ is the angle between the polarization states of the local optical signal 350 and the optical signal 301 as it was input into the transmission system. $V_{offset}$ is a voltage offset resulting from a non-ideal electronic circuit, and $V_N$ is additive noise.

The polarization controller 308 alters the polarization state of the local optical signal 350 over a period of time, as mentioned earlier, thus effectively scanning the angle $\phi$ of Equation 9. If the scanning time to evenly cover the Poincaré sphere is relatively short, such as the two-second scanning time mentioned above, the PDL vector $\vec{\Gamma}$ discussed above may be presumed to remain constant during the scanning time. As a result, maximum and minimum values for the voltage $V_{out}$ may be determined. More specifically, the maximum value $V_{out-max}$ of the voltage $V_{out}$ occurs when the angle $\phi=0$:

$$V_{out-max}=kT+V_{offset}+V_{N1} \quad \text{(Equation 10)}$$

Oppositely, the minimum value $V_{out-min}$ of the voltage $V_{out}$ results when the angle $\phi=\pi$:

$$V_{out-min}=V_{offset}+V_{N2} \quad \text{(Equation 11)}$$

In Equations 10 and 11, $V_{N1}$ and $V_{N2}$ are random noise of zero mean and equal variance. Thus, a difference V between the maximum voltage $V_{out-max}$ and the minimum voltage $V_{out-min}$ may be calculated:

$$V=V_{out-max}-V_{out-min}=kT+V_{N3} \quad \text{(Equation 12)}$$

In Equation 12, $V_{N3}=V_{N1}-V_{N2}$ is also random noise of zero mean, with a variance of $\sigma_{N3}^2$. The mean value $\mu$ and the variance $\sigma^2$ of V may be calculated from the voltage $V_{out}$ of the measurement signal 364 directly. The mean $\mu$ and the variance $\sigma^2$ of V are related to the mean of $m_{11}$ and the variance of $q^2$ of the power transmission coefficient T by way of Equation 8 (defining T) and Equation 12 (relating V to Y):

$$\mu = km_{11} \quad \text{(Equation 13)}$$

$$\sigma^2 = k^2 q^2 + \sigma_{N3}^2 \quad \text{(Equation 14)}$$

As indicated in Equation 8, $|m_{12}|=|T-m_{11}|$. Thus, the partial PDL $\Gamma_{partial}=|m_{12}|/m_{11}$ may be expressed using Equations 12 and 13:

$$\Gamma_{partial} = \frac{|m_{12}|}{m_{11}} = \frac{|T - \mu/k|}{\mu/k} = \left|\frac{V - V_{N3}}{\mu} - 1\right| \quad \text{(Equation 15)}$$

Figure 4A:
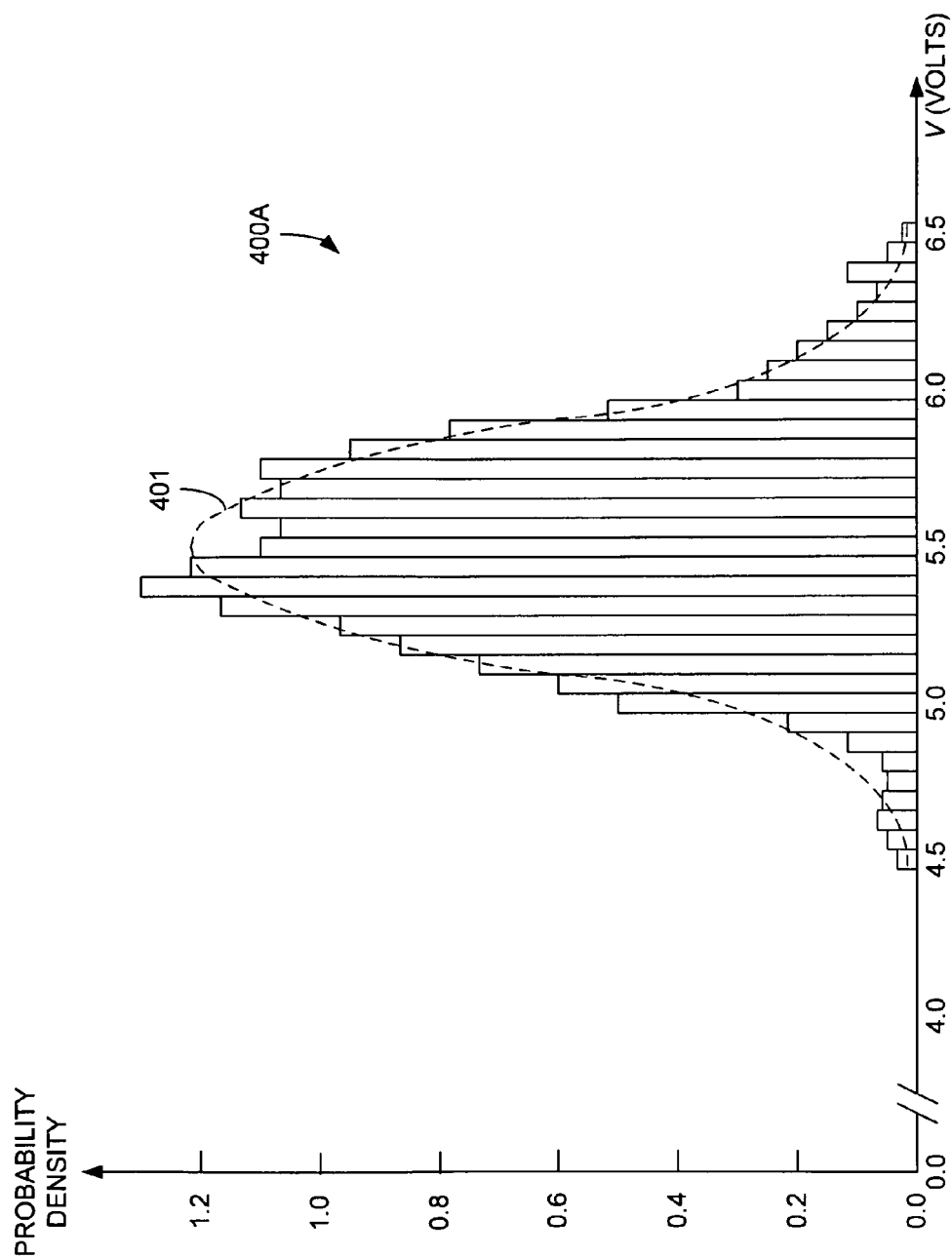
FIG. 4A is a graphical representation of an example probability density distribution of a time-varying voltage representing the power of a radio frequency signal generated by the apparatus of FIG. 3.
Figure 4B:
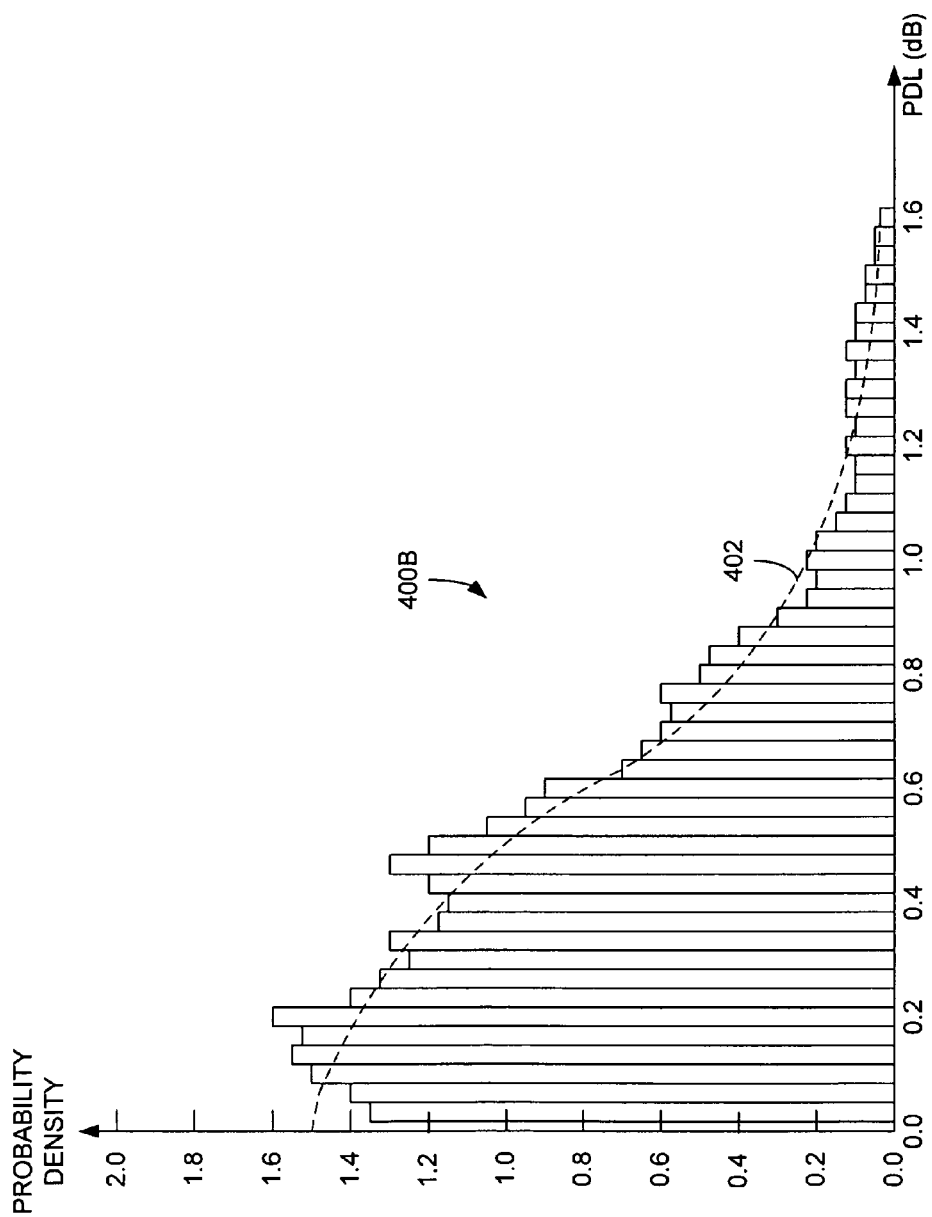
FIG. 4B is a graphical representation of an example probability density distribution of a partial polarization dependent loss related to the time-varying voltage of FIG. 4A.

This calculated partial PDL $\Gamma_{partial}$ randomly varies with time, and is the PDL experienced by the optical signal 301 from the optical transmission system. FIG. 4A provides a histogram 400A of an example set of measured values of V collected over a period of time. Superimposed on the histogram 400A is an ideal normal distribution 401 described by the histogram 400A, which is predicted by the statistical analysis set forth above. A histogram 400B of the time varying partial PDL $\Gamma_{partial}$ derived from the measured values of V is shown in FIG. 4B. Thereupon is indicated a half-normal distribution 402 described by the histogram 400B, also as discussed above.

In FIG. 3, the processor 302 of FIG. 3 performs the calculations necessary to produce the partial PDL distribution $\Gamma_{partial}$ from the voltage values $V_{out}$ of the measurement signal 364, as described herein, and generates an indication 330 of the partial PDL distribution $\Gamma_{partial}$ for use by a system designer or operator in determining whether the tested optical transmission network is performing properly, whether faster optical signals may be carried over the network, and answers to other related questions pertaining to the network. In one example, the indication 330 may include the variance or standard deviation of the partial PDL distribution $\Gamma_{partial}$.

In one example, the processor 302 may be a general purpose or application-specific computer including one or more microprocessors, microcontrollers, digital signal processors (DSPs), or other algorithmic processors capable of executing instructions for performing the calculations described above, as well as controlling any one of the tunable laser 304, optical filter 306, polarization controller 308, and optical amplifier 310. Further, these control functions may be synchronized or otherwise coordinated with the calculations required to generate the indication 330 of the PDL of the optical transmission system under test. In another example, the processor 302 may include hardware components or devices, or a combination of hardware and software elements, for performing these same tasks.

As discussed earlier, another example of the indication 330 of the PDL of the optical transmission network to be calculated and generated may be the average value $\langle\Gamma\rangle$ of the magnitude $\Gamma$ of the PDL vector $\vec{\Gamma}$, as shown earlier in Equation 7. Given the measured mean $\mu$ and variance $\sigma^2$ of voltage V of Equations 13 and 14, the average global PDL $\langle\Gamma\rangle$ may also be calculated:

$$\langle\Gamma\rangle = \sqrt{\frac{8}{\pi}} \frac{\sqrt{\sigma^2 - \sigma_{N3}^2}}{\mu} \quad \text{(Equation 16)}$$

In one implementation, the processor 302 may state the indication 330 directly as the average global PDL $\langle\Gamma\rangle$ in terms of a ratio from Equation 16, or as the more traditional definition of PDL $\rho$ in decibels, as described above.

Various embodiments as described above facilitate measuring the PDL in an optical transmission system under a variety of conditions without the need to introduce a specialized optical test signal over the transmission system. Instead, optical signals already being transferred over the transmission system, such as signals carrying live communication traffic, may be obtained and processed to determine the PDL of the system. As a result, the optical transmission system need not be taken out of service for the PDL measurement to be performed. Additionally, since virtually any signal transmitted over the network may be utilized to perform the measurement, the test system present at the receiver for processing the transmitted signal need not exert any control or influence over the transmitted signal, unlike other PDL measurement systems. As a result, the fact that a transmitter for the optical signal and the corresponding receiver are typically located far away from each other does not pose any problems for implementation of the current method, as control over the input optical signal or the transmitter is not required.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for measuring polarization dependent loss in an optical transmission system, the method comprising:
   generating a first optical signal;
   altering a polarization of the first optical signal over time;
   combining the polarized first optical signal with a second optical signal from the optical transmission system to yield a combined optical signal;
   coherently detecting the combined optical signal to yield a radio frequency signal;
   measuring a power of the radio frequency signal; and
   processing the measured power of the radio frequency signal to generate an indication of the polarization dependent loss of the optical transmission system.

2. The method of claim 1, wherein the second optical signal is a live communication signal carried over the optical transmission system.

3. The method of claim 1, wherein the second optical signal is a wavelength division multiplexed optical signal.

4. The method of claim 3, wherein a wavelength of the first optical signal is tuned to a channel of the wavelength division multiplexed optical signal.

5. The method of claim 1, wherein altering the polarization of the first optical signal over time comprises repeatedly scanning the polarization of the first optical signal in an even distribution over a Poincaré sphere.

6. The method of claim 1, further comprising:
   amplifying the radio frequency signal; and
   bandpass filtering the amplified radio frequency signal prior to measuring the power of the radio frequency signal.

7. The method of claim 1, wherein measuring the power of the radio frequency signal comprises generating a voltage representing the measured power of the radio frequency signal.

8. The method of claim 7, wherein processing the measured power of the radio frequency signal to generate the indication of the polarization dependent loss comprises:
   determining a mean and a variance of the voltage; and
   determining a partial polarization dependent loss of the optical transmission system associated with the second optical signal based upon the mean and the variance of the voltage.

9. The method of claim 7, wherein processing the measured power of the radio frequency signal to generate the polarization dependent loss comprises:
   determining a mean and a variance of the voltage; and
   determining an average global polarization dependent loss of the optical transmission system based upon the mean and the variance of the voltage.

10. An apparatus for measuring polarization dependent loss in an optical transmission system, the apparatus comprising:
   an optical signal generator configured to generate a first optical signal;
   an optical polarization controller configured to alter a polarization of the first optical signal over time;
   an optical coupler configured to combine the polarized first optical signal with a second optical signal from the optical transmission system to yield a combined optical signal;
   a coherent detector configured to generate a radio frequency signal from the combined optical signal;
   a power meter configured to measure a power of the radio frequency signal; and
   a processor configured to process the measured power of the radio frequency signal to generate an indication of the polarization dependent loss of the optical transmission system.

11. The apparatus of claim 10, wherein the processor is configured to control the polarization controller.

12. The apparatus of claim 10, wherein:
   the optical signal generator comprises a tunable laser; and
   the processor is configured to control a wavelength of the tunable laser.

13. The apparatus of claim 10, wherein the coherent detector comprises:
   a photodiode configured to generate the radio frequency signal based on the combined optical signal.

14. The apparatus of claim 13, further comprising:
   an amplifier configured to amplify the radio frequency signal from the photodiode.

15. The apparatus of claim 14, further comprising:
   a bandpass filter configured to filter the amplified radio frequency signal from the amplifier;
   wherein the power meter is configured to measure the power of the filtered radio frequency signal from the bandpass filter.

16. The apparatus of claim 10, wherein:
   the power meter is configured to generate a voltage representing the measured power of the radio frequency signal; and
   the processor is configured to process the voltage to generate the indication of the polarization dependent loss of the optical transmission system.

17. The apparatus of claim 16, wherein, to generate the indication of the polarization dependent loss, the processor is configured to:
   determine a mean and a variance of the voltage; and
   determine a partial polarization dependent loss of the optical transmission system associated with the second optical signal based upon the mean and the variance of the voltage.

18. The apparatus of claim 16, wherein, to generate the indication of the polarization dependent loss, the processor is configured to:
   determine a mean and a variance of the voltage; and
   determine an average global polarization dependent loss of the optical transmission system based upon the mean and the variance of the voltage.

* * * * *